Dec. 6, 1955   F. L. MURDOCK, SR., ET AL   2,726,009
NON-CORROSIVE TANK FOR PETROLEUM PRODUCTS
Filed Sept. 12, 1952
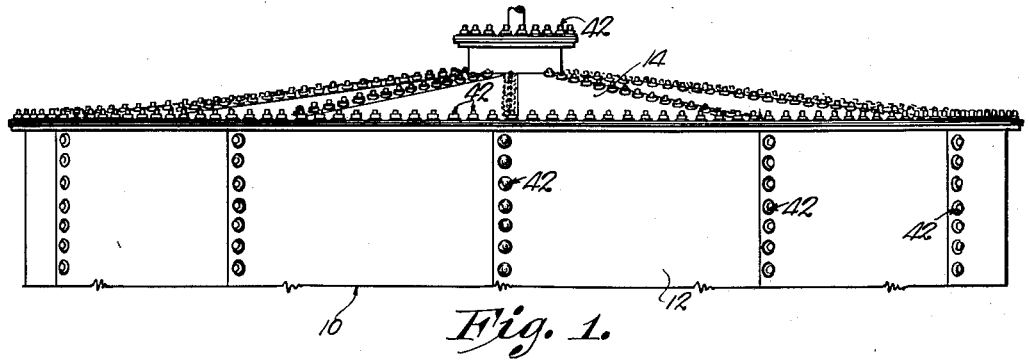
Fig. 1.
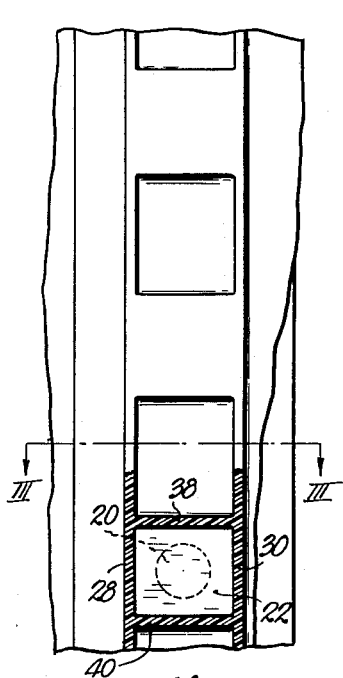
Fig. 2.
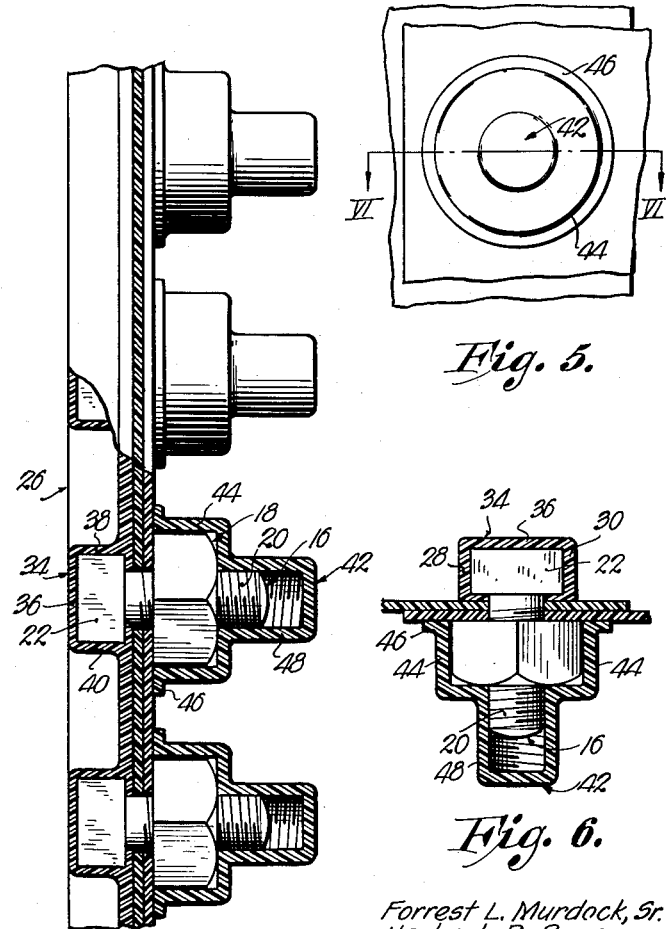
Fig. 5.
Fig. 6.
Fig. 4.
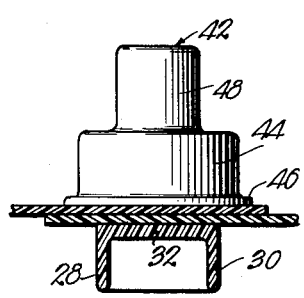
Fig. 3.
Forrest L. Murdock, Sr.
Herbert D. Boggs
Clement T. Beeson
INVENTORS.
BY 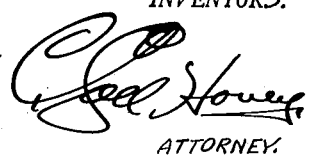
ATTORNEY.

United States Patent Office 2,726,009
Patented Dec. 6, 1955

2,726,009

NON-CORROSIVE TANK FOR PETROLEUM PRODUCTS

Forrest L. Murdock, Sr., Herbert D. Boggs, and Clement T. Beeson, Tulsa, Okla., assignors to Plastic Products Corporation, Tulsa, Okla., a corporation Application September 12, 1952, Serial No. 309,332

2 Claims. (Cl. 220—80)

This invention relates to storage tanks and other container equipment, particularly adapted for use in the oil industry, and has for its primary object the provision of protective means for essential parts of the structure thereby adapting the use of synthetic plastics to the construction of such tanks.

The use of steel and like materials is universal in the field of stock tanks and the like in the petroleum field. These tanks usually take two forms, namely, an all-weld construction and one in which sectional panels are relatively overlapped and interconnected by a plurality of bolts.

Shortage of steel, its expense, necessity of replacement, and many other factors dictate the advisability of resorting to other materials such as any one of many well known synthetic plastics for producing such structures in lieu of metal. It has been impossible however, prior to the present invention, to practicably adapt plastic panels to the construction of oil tanks, for the reason that there has been presented no satisfactory means for interconnecting the panels, and the use of ordinary bolts meets with the corrosive problems rendering the finished structure no longer lasting than the metal tanks heretofore produced.

It is the most important object of the present invention therefore, to eliminate the aforementioned weak spot in all plastic tanks by provision of protecting means for the bolts that interconnect the plastic panels which are in turn overlapped and received by suitable fasteners.

Another important object of the present invention is to provided a plastic tank having a plurality of overlapped panels as aforementioned, interconnected through the use of ordinary metal bolts and nuts, together with washers and other sealing means if desired, the heads of the bolts being entirely protected and hermetically sealed within a substance similar to that from which the panels themselves are made and the nut, as well as a portion of the shank of the bolt, likewise being covered to avoid any possible deleterious effects from corrosion and the like.

It is an important object of this invention to provide an elongated member that includes a strip adapted to lie flatly against the inner face of the tank in sealing relationship to aligned bolt holes through the panels to be interconnected, there being a plurality of pockets arranged in a row for receiving and sealing-in a like number of bolt heads, the shanks whereof pass through the aligned openings.

Other objects of the present invention include the way in which the elongated member tightly surrounds the shanks of the bolts adjacent the head thereof to hermetically seal-in the said heads; the way in which the bolt heads are polygonal in form and the pockets for receiving the same are of like shape to prevent turning of the bolt when the nut is applied; the way in which the elongated strip forming a part of the member is interposed between the bolt head and the proximal face of the tank to close the aligned shank-receiving openings through the overlapped panels; and the way in which the nut, as well as a portion of the shank extending beyond the nut, is additionally protected by means of a member that bears against the outer face of the tank and thereby seals the entire fastening element.

In the drawing:

Figure 1 is a side elevational view of a non-corrosive tank for petroleum products made pursuant to the present invention.

Fig. 2 is an enlarged, fragmentary, inside elevational view showing one of the elongated bolt-receiving members, parts being broken away and in section for clearness.

Fig. 3 is a fragmentary, transverse, cross-sectional view taken on line III—III of Fig. 2.

Fig. 4 is a substantially vertical, enlarged, cross-sectional view through a pair of overlapped panels, and partially through one of the elongated, bolt-receiving members forming the subject matter of this invention.

Fig. 5 is an enlarged, fragmentary, elevational view of the outermost face of the tank illustrating one of the nut and shank covers; and Fig. 6 is a transverse, cross-sectional view taken on line VI—VI of Fig. 5.

As above indicated, the tank chosen for illustration in Fig. 1 of the drawing, and broadly designated by the numeral 10, is made almost entirely from a synthetic plastic material as distinguished from steel or other metallic products heretofore commonly used. There are many synthetic materials presently available that are satisfactory for this purpose and it is well within the skill of those versed in such field to select a material that will withstand virtually all corrosive action, particularly that of the product to be stored within the tank 10, be relatively light-weight, strong and durable and inexpensive.

Applicant does not purport in this invention to claim any invention on such materials, either for the panels of the tank 10, or the bolt protecting means about to be described. Furthermore, it is not desired to be limited by any particular type of substance for carrying out the invention since such is recognized as being well known prior to this invention.

Tank 10 is cylindrical in the example illustrated and includes a plurality of elongated, transversely arched panels 12 forming the side wall thereof, the panels 12 being partially overlapped along proximal marginal edges. The roof of the tank 10 is likewise made from a plurality of triangular-shaped sections 14 that are relatively overlapped in the same manner. Similar construction through use of panels made from synthetic plastic materials may be adapted for the bottom of tank 10, not herein illustrated.

In accordance with the present invention, the overlapped panels 12 are interconnected by use of a plurality of bolt and nut assemblies 16 and 18 respectively, the bolts 16 have screw threaded shanks 20 provided with a polygonal head 22 at one end thereof. The panels 12 and, of course, panels 14, are all provided with aligned openings 24, arranged in a row at the point of overlapping. Accordingly, there is provided a bolt 16 for each pair of aligned openings 24 respectively.

A plurality of bolts 16 are held in alignment, spaced predetermined distances according to the distances between the openings 24, with the shanks 20 thereof in parallelism by means of an elongated member broadly designated by the numeral 26 that serves additionally as a means of protecting the heads 22 of the bolts 16 against corrosive action of the substances to be contained in the tank 10, and functions also as a means of sealing the holes 24 when the member 26 is rigidly attached by the cooperative action of nuts 18.

The elongated member 26 is U-shaped in transverse cross-section, presenting a pair of spaced, parallel legs 28 and 30 and an elongated strip-like bight 32. The two legs 28 and 30 of the member 26 form two opposed, parallel sides of a plurality of spaced pockets broadly designated by the numeral 34 for receiving the heads 22 of the bolts 16. Each pocket 34 is likewise provided with an outermost side wall 36 and a pair of end walls 38 and 40.

It is noted that the strip 32 tightly surrounds the shank 20 of the bolts 16 adjacent the head 22, thereby completing the pocket 34 and hermetically sealing the head 22 therewithin. All of the walls of the pockets 34 bear against the corresponding polygonal walls of the head 22, thereby restraining the bolts 16 against rotation on the longitudinal axes of the shanks 20 thereof when nut 18 is applied to such shanks 20. Thus, in assembling operations, the workmen need merely align the holes 24 of the relatively overlapped panels 12 and simultaneously insert all of the shanks 20 through the openings 24 for receiving the corresponding nuts 18. When the nuts 18 are drawn tight against the outermost face of the tank 10, the elongated strip 32 will be in turn drawn tightly against the innermost face of the tank 10 with a portion of the strip 32 interposed between the head 22 and the proximal panel 12. This completely seals in the head 22, protects the shank 20 from corrosive action of any substance within the tank 10, and as is clear from viewing Figs. 4 and 6 of the drawing, the strip 32 closes off the openings 24, presenting therefore, a liquid-tight interconnection.

It is desirable additionally to protect the nut 18 and the extended portion of shank 20, exteriorly of the tank 10 and to this end, there is provided a cup-like member 42 having a preferably cylindrical portion 44 that surrounds the nut 18, an out-turned annular flange 46 that bears against the outermost face of tank 10, and a second internally tapped cylindrical portion 48 adapted for connection with the screw threads of the shank 20.

Only the essential features of the invention have been illustrated, but it is manifest that if desired, the shank 20 may be surrounded with washers or other sealing means, bearing against the panels 12 adjacent the openings 24, but it has been found that when the protectors 26 and 42 are provided for, such additional sealing means is normally not necessary. It is reiterated that the substance from which the two protecting elements 26 and 42 is made may be selected as desired to overcome any adverse effects of chemical activity, not only on the part of the petroleum products to be contained in the tank 10, but so far as the elements are concerned, acting upon the tank 10 exteriorly thereof.

The manner of producing the elements 26 and 42 is likewise not contemplated as a part of the present invention since any suitable molding operations may be used and, while the synthetic materials that are suitable for the purposes herein outlined are normally rather rigid, yet the same has sufficient flexibility to conform to any irregularities in the panels 12, thereby permitting the drawing of the strip 32 tightly against the inner wall of the tank 10 and sealing off the openings 24 as aforesaid.

It is manifest that while only the preferred form of the invention has been herein illustrated and described, the same is capable of various and sundry alterations within the spirit of the invention and it is, therefore, desired to be limited only by the scope of the appended claims.

Having thus described the invention, what is claimed as new and desired to be secured by Letters Patent is:

1. In tank structure, the combination of a pair of relatively overlapped panels, each panel being provided with a straight row of spaced openings along the zone of overlap, corresponding openings of said panels being in alignment; an elongated, unitary, straight member including an elongated strip having a side in tight engagement with one panel and provided with a perforation for and in alignment with each pair of corresponding openings respectively, and means presenting an enclosed pocket for and in communication with each of said perforations respectively, said pocket presenting means all being on the opposite side of the strip, a bolt for each pocket respectively, each bolt having a polygonal head enclosed within a corresponding pocket and a shank provided with threads and extending through the corresponding perforation and a corresponding pair of openings, said pockets being of size and configuration complemental to the heads for preventing shifting of the bolts relative to the member, said strip tightly engaging each shank to hermetically seal the corresponding head within the corresponding pocket; and nut means on the shank of each bolt respectively in tight engagement with the other panel opposite said one panel for holding the panels tightly interengaged, the member having a substantially higher resistance to corrosion than the bolts.

2. In the structure as set forth in claim 1, wherein is provided a cap for each nut means respectively, each of said caps being threadably secured upon an end portion of a corresponding shank and having parts covering the corresponding nut means and shank portion and in tight engagement with said other panel opposite said one panel for cooperating with said nut means in holding the panels together.

References Cited in the file of this patent

UNITED STATES PATENTS

| | | |
|---|---|---|
| 2,172,851 | Reynolds | Sept. 12, 1939 |
| 2,235,937 | Linberg | Mar. 25, 1941 |
| 2,439,244 | De Weese | Apr. 6, 1948 |
| 2,594,599 | Uhri | Apr. 29, 1952 |